(12) United States Patent
Kobayashi

(10) Patent No.: US 12,200,675 B2
(45) Date of Patent: Jan. 14, 2025

(54) COMMUNICATION CONTROL APPARATUS AND COMMUNICATION CONTROL METHOD

(71) Applicant: FUJITSU LIMITED, Kawasaki (JP)

(72) Inventor: Takaharu Kobayashi, Yamato (JP)

(73) Assignee: FUJITSU LIMITED, Kawasaki (JP)

( * ) Notice: Subject to any disclaimer, the term of this patent is extended or adjusted under 35 U.S.C. 154(b) by 438 days.

(21) Appl. No.: 17/533,162

(22) Filed: Nov. 23, 2021

(65) Prior Publication Data

US 2022/0272700 A1 Aug. 25, 2022

(30) Foreign Application Priority Data

Feb. 19, 2021 (JP) ................................. 2021-025716

(51) Int. Cl.
*H04W 72/0453* (2023.01)
*H04L 5/00* (2006.01)
*H04W 28/16* (2009.01)

(52) U.S. Cl.
CPC ....... *H04W 72/0453* (2013.01); *H04L 5/0035* (2013.01); *H04L 5/0037* (2013.01); *H04W 28/16* (2013.01)

(58) Field of Classification Search
CPC . H04W 72/0453; H04W 28/16; H04W 16/14; H04L 5/0035; H04L 5/0037; H04L 5/001; H04L 5/0094; H04L 5/0053
See application file for complete search history.

(56) References Cited

U.S. PATENT DOCUMENTS

| | | | |
|---|---|---|---|
| 9,839,035 B2 * | 12/2017 | Madan | H04W 16/14 |
| 10,911,313 B2 * | 2/2021 | Brooks | H04N 21/6373 |
| 11,304,109 B1 * | 4/2022 | Potharaju | H04W 8/24 |
| 2012/0218962 A1 | 8/2012 | Kishiyama et al. | |
| 2013/0163540 A1 | 6/2013 | Roh et al. | |
| 2015/0281974 A1 * | 10/2015 | Ghasemzadeh | H04W 72/0453 455/454 |

(Continued)

FOREIGN PATENT DOCUMENTS

| JP | 2011-082709 A | 4/2011 |
|---|---|---|
| JP | 2016-192632 A | 11/2016 |

(Continued)

OTHER PUBLICATIONS

Japanese Office Action mailed Aug. 20, 2024 for corresponding Japanese Patent Application No. 2021-025716, with English Translation, 5 pages.

*Primary Examiner* — Yu-Wen Chang
(74) *Attorney, Agent, or Firm* — Fujitsu Intellectual Property Center

(57) ABSTRACT

A communication control apparatus allocates, to a plurality of operators, a band of each of a plurality of radio units that are shared by the operators and that are connected to a plurality of baseband units managed by the operators. The communication control apparatus includes: a memory; a processor that allocates the band of each of the radio units to the operators in accordance with an upper band use limit that is set for each of the radio units such that a use band used by the operators does not exceed the upper band use limit; and an output unit that outputs allocation information indicating the band allocated to the operators by the processor to each of the baseband units.

6 Claims, 15 Drawing Sheets

| | MNO#0 | | MNO#1 | |
|---|---|---|---|---|
| | F#0 | F#1 | F#0 | F#1 |
| RU#0 | 1 | 0 | 1 | 0 |
| RU#1 | 0 | 1 | 0 | 1 |
| RU#2 | 1 | 0 | 1 | 0 |
| RU#3 | 1 | 0 | 1 | 0 |
| RU#4 | 0 | 1 | 0 | 1 |
| RU#5 | 1 | 0 | 1 | 0 |
| RU#6 | 1 | 0 | 1 | 0 |
| RU#7 | 0 | 1 | 0 | 1 |
| RU#8 | 0 | 1 | 0 | 1 |
| RU#9 | 0 | 1 | 0 | 1 |
| RU#10 | 1 | 0 | 1 | 0 |
| RU#11 | 0 | 1 | 0 | 1 |

(56) References Cited

U.S. PATENT DOCUMENTS

| | | | | |
|---|---|---|---|---|
| 2017/0245179 A1* | 8/2017 | Callard | ................ | H04W 24/04 |
| 2017/0318468 A1* | 11/2017 | Aijaz | .................... | H04W 16/10 |
| 2021/0235451 A1* | 7/2021 | Parekh | ................. | H04W 72/04 |
| 2021/0321390 A1* | 10/2021 | Muta | ................... | H04W 88/085 |
| 2021/0400527 A1* | 12/2021 | Notargiacomo | ...... | H04W 28/26 |
| 2022/0132320 A1* | 4/2022 | Bye | .................... | H04W 12/102 |
| 2022/0150915 A1* | 5/2022 | Terabe | ............... | H04W 72/566 |

FOREIGN PATENT DOCUMENTS

| | | |
|---|---|---|
| JP | 2017-135686 A | 8/2017 |
| JP | 2021-22858 A | 2/2021 |

\* cited by examiner

FIG.8

|  | MNO#0 | | MNO#1 | |
| --- | --- | --- | --- | --- |
|  | F#0 | F#1 | F#0 | F#1 |
| RU#0 | 1 | 0 | 1 | 0 |
| RU#1 | 0 | 1 | 0 | 1 |
| RU#2 | 1 | 0 | 1 | 0 |
| RU#3 | 1 | 0 | 1 | 0 |
| RU#4 | 0 | 1 | 0 | 1 |
| RU#5 | 1 | 0 | 1 | 0 |
| RU#6 | 1 | 0 | 1 | 0 |
| RU#7 | 0 | 1 | 0 | 1 |
| RU#8 | 0 | 1 | 0 | 1 |
| RU#9 | 0 | 1 | 0 | 1 |
| RU#10 | 1 | 0 | 1 | 0 |
| RU#11 | 0 | 1 | 0 | 1 |

FIG.9

| | RU#0 | | | | RU#1 | | | | ... | RU#10 | | | | RU#11 | | |
|---|---|---|---|---|---|---|---|---|---|---|---|---|---|---|---|---|
| | F#0 | | F#1 | | F#0 | | F#1 | | | F#0 | | F#1 | | F#0 | | F#1 |
| | 1 | | 0 | | 0 | | 1 | | | 1 | | 0 | | 0 | | 1 |
| UE#0 | 0.00 | | 0.00 | | 0.00 | | 0.00 | | | 0.26 | | 0.00 | | 0.00 | | 0.00 |
| UE#1 | 0.00 | | 0.00 | | 0.00 | | 0.00 | | | 0.00 | | 0.00 | | 0.00 | | 0.00 |
| UE#2 | 0.00 | | 0.00 | | 0.00 | | 0.00 | | | 0.00 | | 0.00 | | 0.00 | | 0.00 |
| UE#3 | 0.00 | | 0.00 | | 0.00 | | 0.00 | | | 0.31 | | 0.00 | | 0.00 | | 0.14 |
| UE#4 | 0.26 | | 0.00 | | 0.00 | | 0.00 | | | 0.00 | | 0.00 | | 0.00 | | 0.00 |
| UE#5 | 0.00 | | 0.00 | | 0.00 | | 0.00 | | | 0.00 | | 0.00 | | 0.00 | | 0.00 |
| ... | ... | | ... | | ... | | ... | | | ... | | ... | | ... | | ... |
| UE#25 | 0.13 | | 0.00 | | 0.00 | | 0.12 | | | 0.00 | | 0.00 | | 0.00 | | 0.00 |
| UE#26 | 0.18 | | 0.00 | | 0.00 | | 0.00 | | | 0.00 | | 0.00 | | 0.00 | | 0.00 |
| UE#27 | 0.00 | | 0.00 | | 0.00 | | 0.00 | | | 0.00 | | 0.00 | | 0.08 | | 0.00 |
| UE#28 | 0.00 | | 0.00 | | 0.00 | | 0.00 | | | 0.00 | | 0.00 | | 0.00 | | 0.00 |
| UE#29 | 0.00 | | 0.00 | | 0.00 | | 0.00 | | | 0.00 | | 0.00 | | 0.00 | | 0.00 |

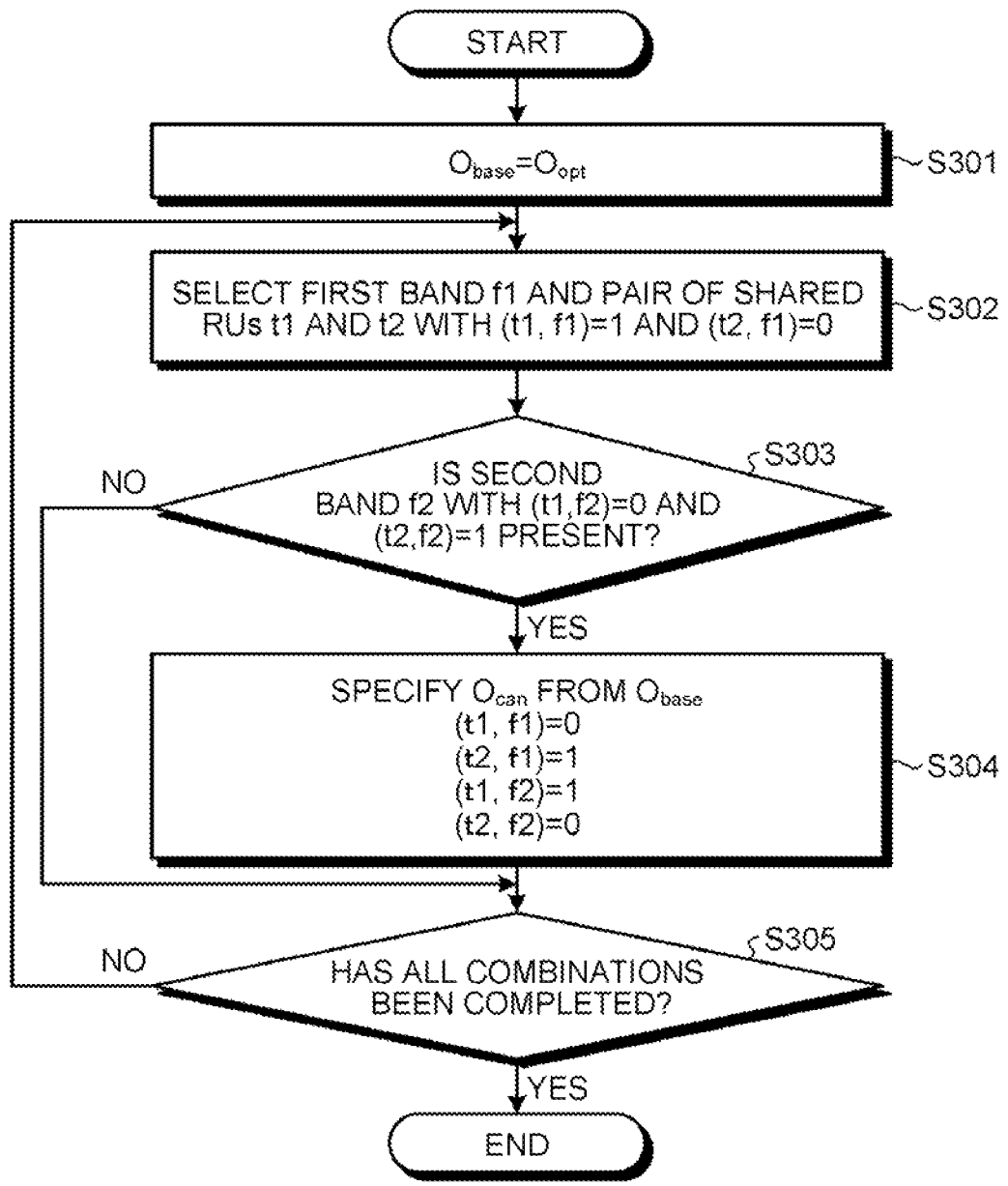

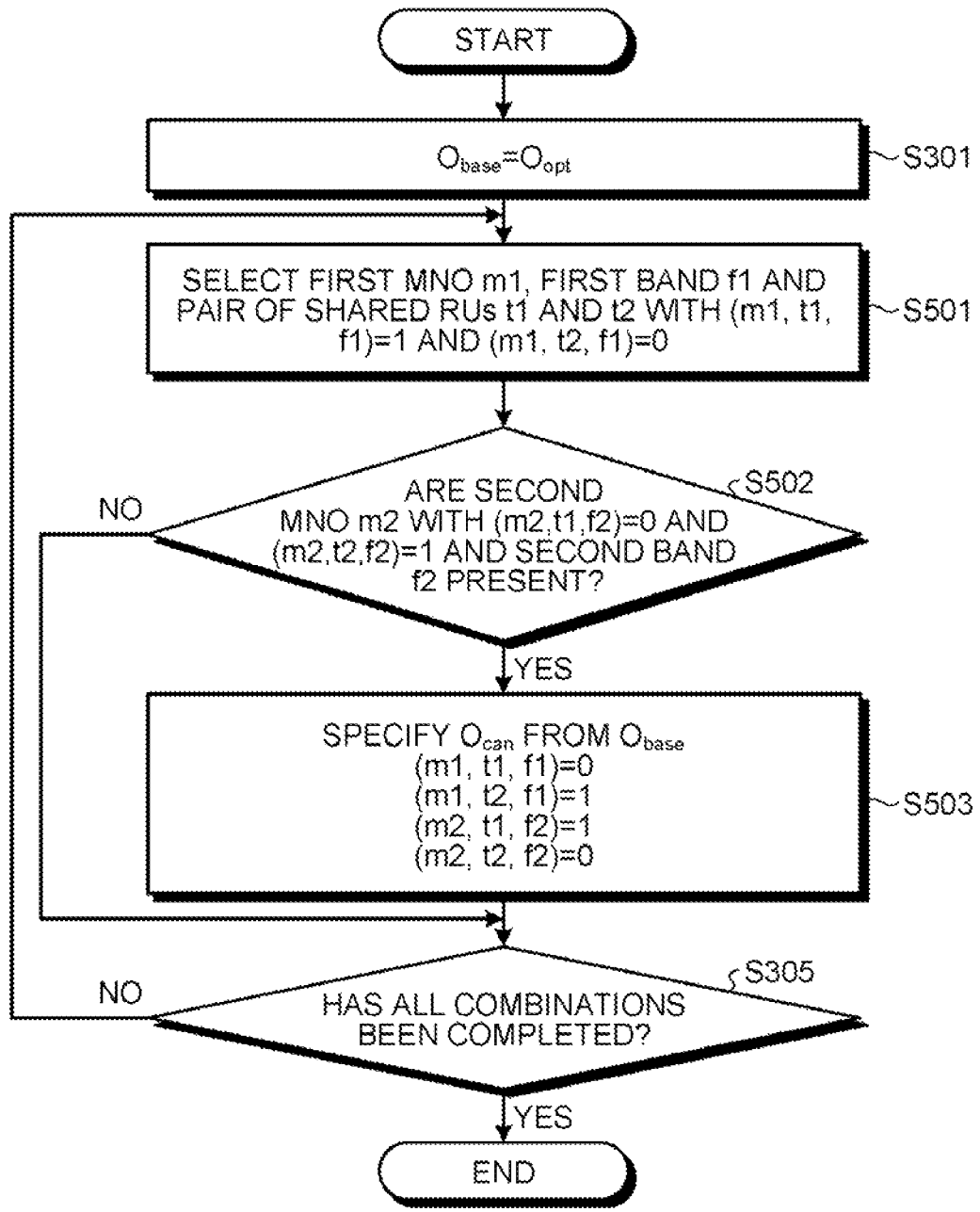

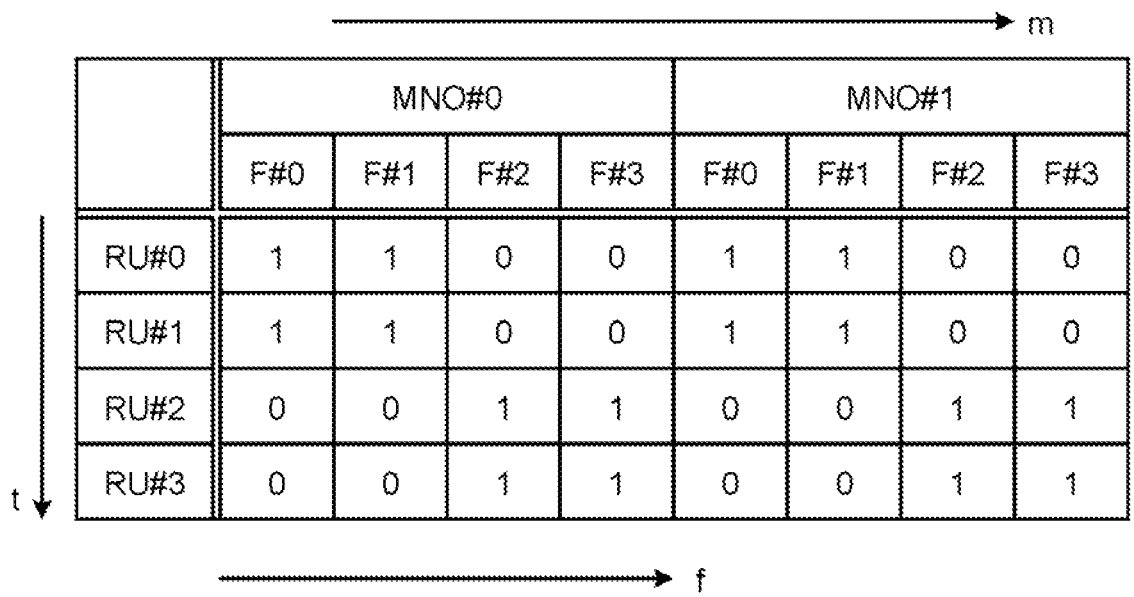

COMMUNICATION CONTROL APPARATUS AND COMMUNICATION CONTROL METHOD

CROSS-REFERENCE TO RELATED APPLICATION

This application is based upon and claims the benefit of priority of the prior Japanese Patent Application No. 2021-025716, filed on Feb. 19, 2021, the entire contents of which are incorporated herein by reference.

FIELD

The embodiments discussed herein are related to a communication control apparatus and a communication control method.

BACKGROUND

In recent years, in wireless communication systems, services using the fifth generation mobile communication (5G) capable of performing high-speed and large-capacity data communication are being introduced. In services using 5G, for example, radio waves, such as millimeter waves, having frequencies higher than those used in Long Term Evolution (LTE) or the like are used. The radio waves at such high frequencies have straightness characteristics and are less likely to pass through shielding objects, so that a radius of a cell tends to be smaller. Consequently, in order to construct wireless communication systems, there is a need to install base station apparatuses at high densities.

Specifically, base station apparatuses are split into, for example, baseband units (i.e., central units/distributed units: CU/DUs) that perform a baseband process and radio units (RUs) that perform a radio process; therefore, the RUs having antennas are disposed at high densities. Accordingly, telecommunications carriers (i.e., mobile network operators: MNOs) that construct wireless communication systems are able to efficiently expand communication areas and system capacity by installing RUs that can be shared in cooperation with other MNOs.

Patent Document 1: Japanese Laid-open Patent Publication No. 2016-192632
Patent Document 2: Japanese Laid-open Patent Publication No. 2011-82709

Incidentally, as a method of installing the RUs shared by the plurality of MNOs (hereinafter, referred to as "shared RUs"), it is conceivable to substitute dedicated RUs, which are already installed for each MNO, with the shared RUs. Consequently, the CU/DUs for each MNO are connected to a lot of shared RUs as compared in a case where the CU/DUs are connected to the dedicated RUs, and a front haul (FH) line that connects the CU/DUs and the shared RUs is accordingly shared by the plurality of MNOs.

However, even if the dedicated RUs are substituted with the shared RUs, it is difficult to further enhance and add the CU/DUs and the FH lines for each MNO, and there is a problem in that, if each of the MNOs uses the shared RUs, output capacity of the CU/DUs or capacity of the FH lines may sometimes exceeds. Namely, if a use band of the shared RUs is increased in accordance with the number of MNOs that share the shared RUs, the capacity of each of the CU/DUs and the FH lines does not follow an increase in use band; therefore, expansion of system capacity is limited.

SUMMARY

According to an aspect of an embodiment, a communication control apparatus allocates, to a plurality of operators, a band of each of a plurality of radio units that are shared by the operators and that are connected to a plurality of baseband units managed by the operators. The communication control apparatus includes: a memory; a processor that allocates the band of each of the radio units to the operators in accordance with an upper band use limit that is set for each of the radio units such that a use band used by the operators does not exceed the upper band use limit; and an output unit that outputs allocation information indicating the band allocated to the operators by the processor to each of the baseband units.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 8 is a diagram illustrating a specific example of a use band matrix O;
FIG. 9 is a diagram illustrating a specific example of an optimum weight matrix W;
FIG. 10 is a flowchart illustrating a search pattern specifying process;
FIG. 14 is a flowchart illustrating a search pattern specifying process;
and
FIGS. 15A and 15B are diagrams illustrating specific examples of a search pattern.

DESCRIPTION OF EMBODIMENTS

Preferred embodiments of the present invention will be explained with reference to accompanying drawings. The present invention is not limited to the embodiments.

[a] First Embodiment

Figure 1:
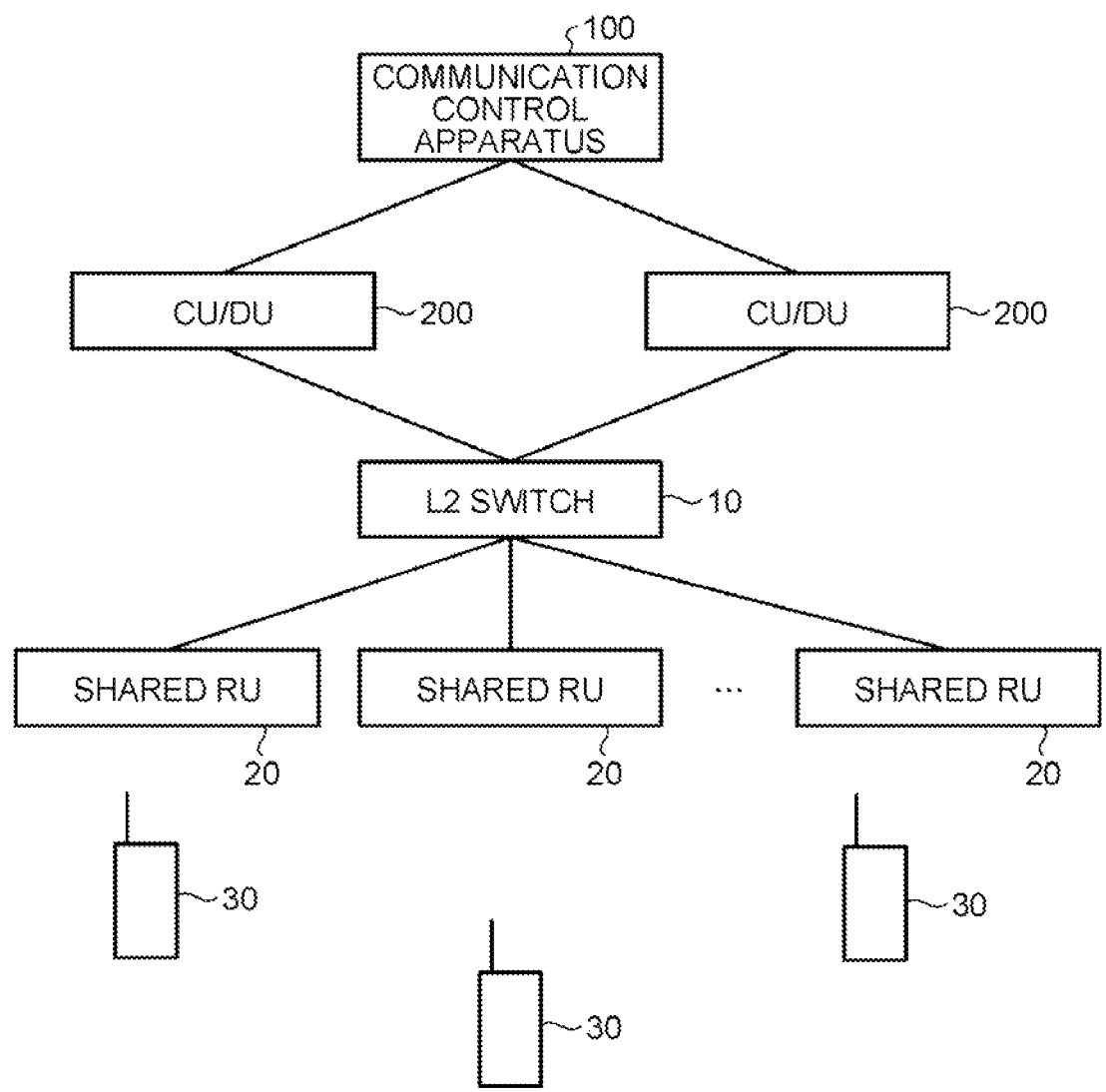
FIG. 1 is a diagram illustrating a configuration example of a wireless communication system.

FIG. 1 is a configuration example of a wireless communication system according to a first embodiment. In the wireless communication system illustrated in FIG. 1, a plurality of CU/DUs 200 managed by different MNOs share a plurality of shared RUs 20. Namely, the plurality of CU/DUs 200 are connected to the plurality of shared RUs 20 via a L2 switch 10. A line that connects each of the CU/DUs 200 to the shared RUs 20 is a front-haul line (FH line).

Furthermore, the plurality of CU/DUs 200 are connected to a communication control apparatus 100 that is used in common.

The communication control apparatus 100 is called, for example, a RAN Intelligent Controller (RIC) and controls a base station. The communication control apparatus 100 controls the CU/DUs 200 that are baseband units constituting a base station. Specifically, the communication control apparatus 100 allocates bands used by each of the shared RUs 20 to the CU/DUs 200 that are associated with a plurality of MNOs. At this time, the communication control apparatus 100 allocates the bands to each of the CU/DUs 200 such that the bands that are used for each of the shared RUs 20 do not exceed a predetermined amount and a data output amount that is output from each of the CU/DUs 200 does not exceed a predetermined amount. Furthermore, the communication control apparatus 100 optimizes a use band for each of the shared RU 20 so as to maximize a predetermined metric and decides the use band to be used for wireless communication with the shared RU 20 performed by each of terminal devices (i.e., user equipment: UE) 30. A configuration and an operation of the communication control apparatus 100 in detail will be described later.

The CU/DUs 200 are baseband units constituting a base station. The CU/DUs 200 are connected to a core network (not illustrated) for each MNO and perform a baseband process on data for each MNO. Furthermore, the CU/DUs 200 acquire information on UEs 30 that are connected to the plurality of shared RUs 20 via the FH lines, that perform wireless communication with each of the shared RUs 20, and that are managed by the own MNO. Then, the CU/DU 200 notifies the communication control apparatus 100 of the acquired UE information.

Furthermore, if the band of the shared RU 20 is allocated by the communication control apparatus 100, the CU/DUs 200 perform scheduling of the allocated band, and then, transmit and receive data to and from the shared RU 20 via the FH line. A configuration and an operation of the CU/DU 200 in detail will be described later in detail.

The L2 switch 10 is installed on the FH line and connects the plurality of CU/DUs 200 and the plurality of shared RUs 20.

The shared RUs 20 are radio units constituting a base station. The shared RUs 20 connect to the plurality of CU/DUs 200 associated with the plurality of respective MNOs and perform a radio process on the data. Namely, the shared RUs 20 wirelessly transmit and receive data to and from the UEs 30 included in a cell. The shared RU 20 is able to use a plurality of bands for each MNO, communicates with each of the CU/DUs 200 by using the band instructed from the respective CU/DUs 200 associated with each of the MNOs, and performs wireless communication with the UEs 30 that is under the purview of the subject MNO.

The UEs 30 are terminal devices that are capable of performing wireless communication. The UEs 30 perform wireless communication with the shared RUs 20 that form a cell in which the UEs 30 are present. The UEs 30 are under the purview of one of the plurality of MNOs that shares the shared RU 20 and transmit and receive data to and from the CU/DU 200 associated with the subject MNO.

Figure 2:
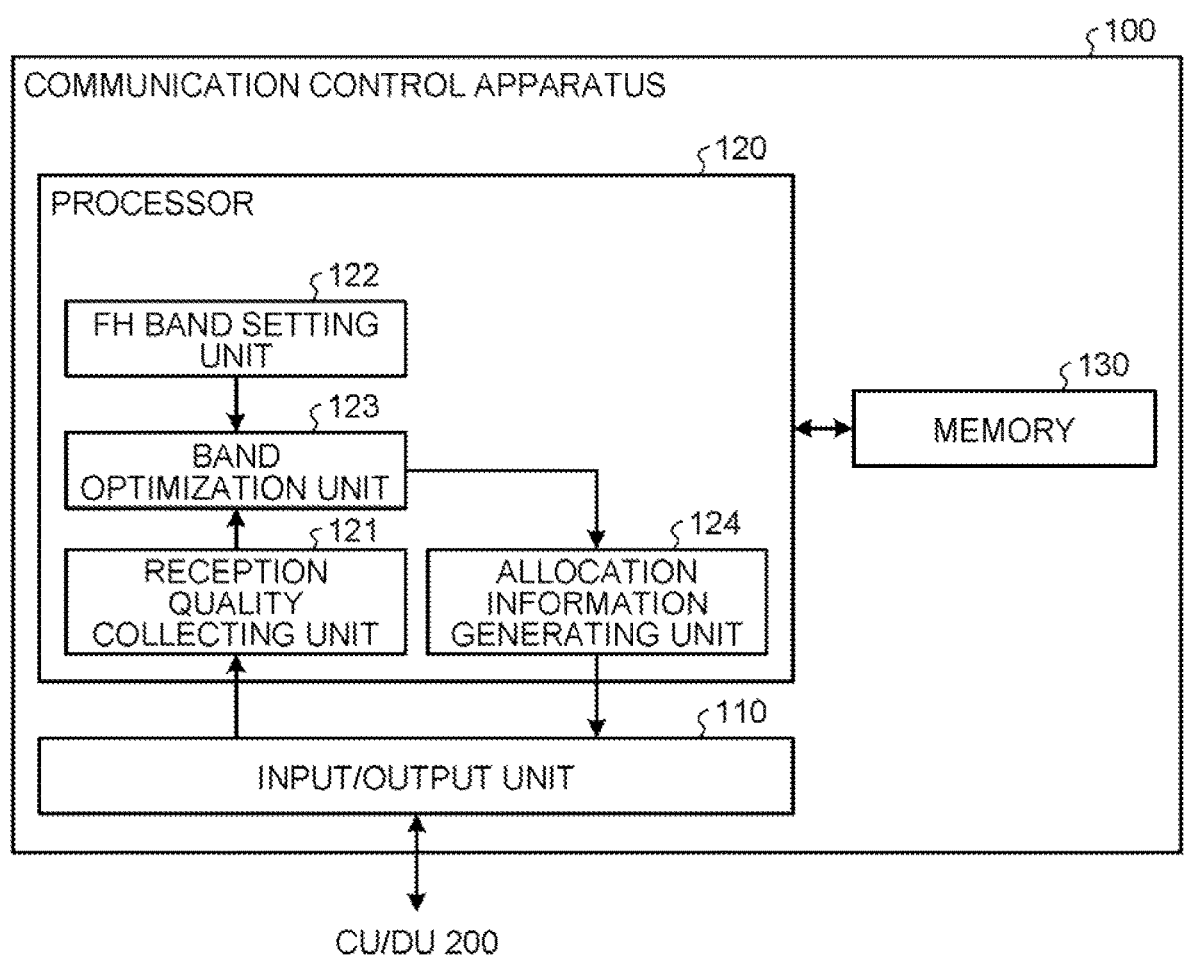
FIG. 2 is a block diagram illustrating a configuration of a communication control apparatus according to a first embodiment.

FIG. 2 is a block diagram illustrating a configuration of the communication control apparatus 100 according to the first embodiment. The communication control apparatus 100 illustrated in FIG. 2 includes an input/output unit 110, a processor 120, and a memory 130.

The input/output unit 110 receives an input of information from the CU/DU 200 by connecting to the plurality of CU/DUs 200 and outputs the information to the CU/DUs 200. Specifically, the input/output unit 110 receives, from each of the CU/DUs 200, an input of the information related to the UE 30 that is under the purview of each of the MNOs. Furthermore, the input/output unit 110 outputs allocation information related to the use band of the shared RU 20 allocated to each of the CU/DUs 200.

The processor 120 includes, for example, a central processing unit (CPU), a field programmable gate array (FPGA), a digital signal processor (DSP), or the like and performs overall control of the communication control apparatus 100. Specifically, the processor 120 includes a reception quality collecting unit 121, a FH band setting unit 122, a band optimization unit 123, and an allocation information generating unit 124.

The reception quality collecting unit 121 collects information on reception quality in the UE 30 from notification information that is input to the input/output unit 110 from the CU/DU 200 associated with each of the MNOs. Namely, the reception quality collecting unit 121 collects information on the reception quality in each of the UE 30 that performs wireless communication with the shared RU 20. An example of the reception quality includes Reference Signal Received Power (RSRP) or the like.

The FH band setting unit 122 manages a band of the FH line for each of the shared RU 20 and notifies the band optimization unit 123 of a predetermined upper band use limit that is set for each of the CU/DUs 200 and each of the shared RUs 20. Here, the band of the FH line corresponds to the radio band between the shared RU 20 and the UE 30 and all of the bands are split into available bands for the respective MNOs. Furthermore, the available band for each MNO is split into a plurality of unit bands each having a predetermined bandwidth. The FH band setting unit 122 notifies the band optimization unit 123 of the number of unit bands corresponding to the upper limit of the available band for each MNO related to the FH line used by the shared RU 20.

The band optimization unit 123 decides a use band for each of the shared RUs 20 in accordance with the upper band use limit that is notified from the FH band setting unit 122. Namely, the band optimization unit 123 allocates a band for each of the shared RU 20 to each of the MNOs such that the number of unit bands used by each of the MNOs in each of the shared RUs 20 does not exceed the predetermined upper band use limit. Furthermore, the band optimization unit 123 calculates, on the basis of reception quality in each of the UEs 30, a metric corresponding to an indicator of band allocation fairness with respect to each of the MNOs and an indicator of throughput, and then, optimizes the band allocation with respect to each of the MNOs so as to maximize the subject metric. Furthermore, at the same time as optimizing the band allocation with respect to each of the MNO, the band optimization unit 123 decides the UEs 30 that perform wireless communication with the shared RUs 20 in each of the unit bands used by the shared RUs 20.

The allocation information generating unit 124 generates allocation information indicating a band for each of the shared RUs 20 that are allocated to the respective MNOs by the band optimization unit 123. At this time, the allocation information generating unit 124 adds, to the allocation information addressed to the CU/DUs 200 associated with the respective MNOs, information that indicates a unit band for each of the shared RUs 20 allocated to the subject MNOs and identification information on the UEs 30 that perform wireless communication with the shared RUs 20 in each of the associated unit bands. The allocation information is output from the input/output unit 110 to the CU/DU 200 that is associated with each of the MNOs.

The memory 130 includes, for example, a random access memory (RAM), a read only memory (ROM), or the like and stores information that is used for processes performed by the processor 120.

Figure 3:
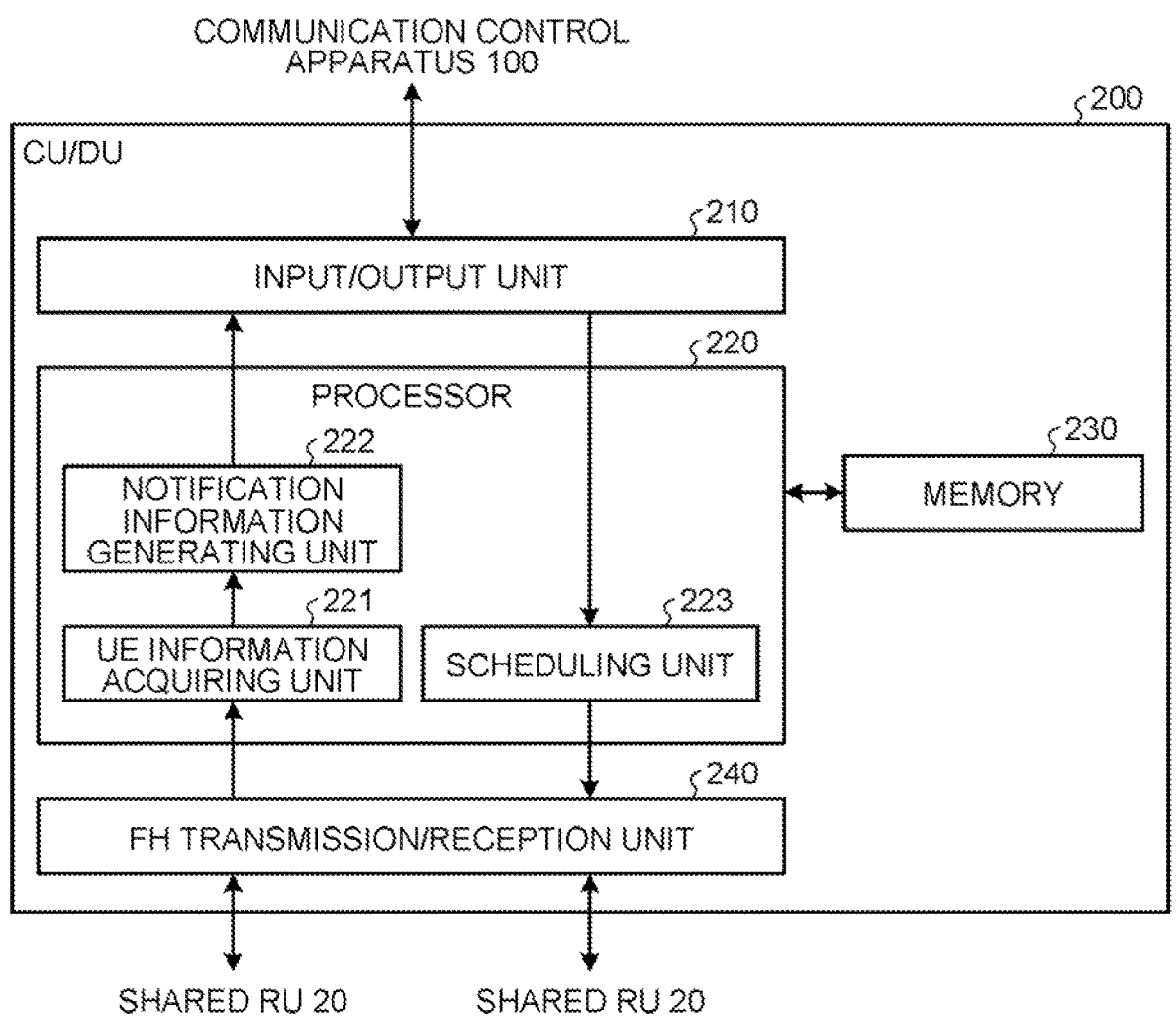
FIG. 3 is a block diagram illustrating a configuration of a CU/DU according to the first embodiment.

FIG. 3 is a block diagram illustrating a configuration of the CU/DU 200 according to the first embodiment. The CU/DU 200 illustrated in FIG. 3 includes an input/output unit 210, a processor 220, a memory 230, and a FH transmission/reception unit 240.

The input/output unit 210 outputs information to the communication control apparatus 100 by connecting to the communication control apparatus 100 and receives an input of information received from the communication control apparatus 100. Specifically, the input/output unit 210 receives an input of allocation information indicating a band for each of the shared RUs 20 allocated to the own MNO. Furthermore, the input/output unit 210 outputs notification information for notifying of reception quality of the UE 30 that belongs to the own MNO.

The processor 220 includes, for example, a CPU, an FPGA, a DSP, or the like and performs overall control of the CU/DU 200. Specifically, the processor 220 includes a UE information acquiring unit 221, a notification information generating unit 222, and a scheduling unit 223.

The UE information acquiring unit 221 acquires information on the UE 30 that performs wireless communication with the plurality of shared RUs 20 connected to the CU/DU 200. Specifically, the UE information acquiring unit 221 acquires, from each of the shared RUs 20, UE information related to reception quality, such as RSRP, in each of the UEs 30.

The notification information generating unit 222 generates notification information that is used to notify the communication control apparatus 100 of the UE information acquired by the UE information acquiring unit 221. Namely, the notification information generating unit 222 generates notification information including information on reception quality in the UEs 30 that perform wireless communication with each of the shared RUs 20. Then, the notification information generating unit 222 outputs the generated notification information from the input/output unit 210 to the communication control apparatus 100.

The scheduling unit 223 performs scheduling of the FH line for each of the shared RUs 20 in accordance with the allocation information received by the input/output unit 210. Namely, the scheduling unit 223 sets the FH transmission/reception unit 240 so as to communicate with the shared RU 20 of which band is allocated to the own MNO, and then, performs scheduling for allocating radio resources to the UEs 30 each using the unit band.

The memory 230 includes, for example, a RAM, a ROM, or the like, and stores information that is used for the processes performed by the processor 220.

The FH transmission/reception unit 240 transmits and receives data to and from the shared RU 20 via the FH line in accordance with the scheduling performed by the scheduling unit 223. Namely, the FH transmission/reception unit 240 transmits, to the shared RU 20 associated with the own MNO to which a band is allocated, data addressed to the UE 30 that uses the subject band. Furthermore, the FH transmission/reception unit 240 receives, from the shared RU 20 associated with the own MNO to which a band is allocated, data transmitted from the UE 30 that uses the subject band.

Figure 4:
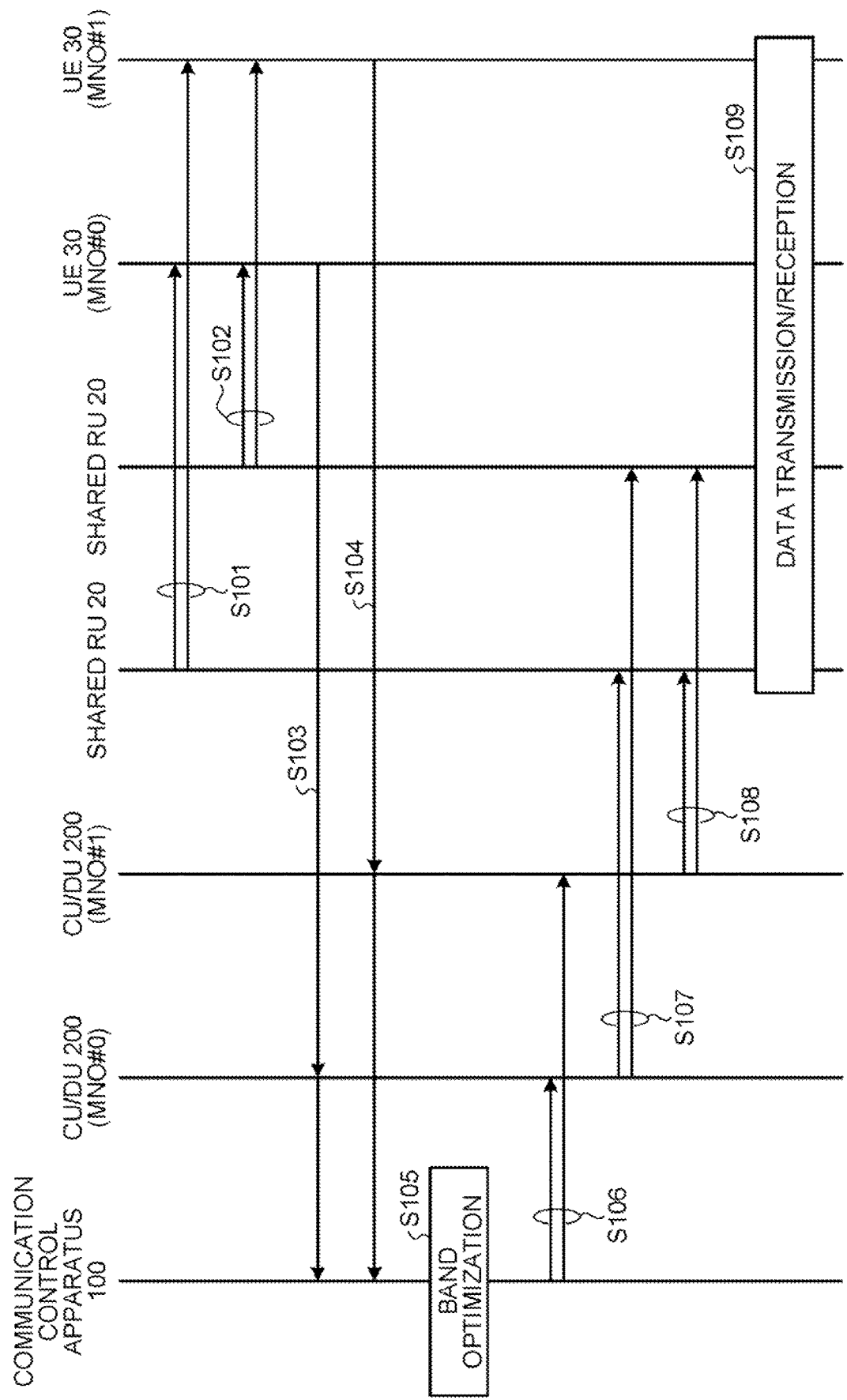
FIG. 4 is a sequence diagram of a communication method.

In the following, a communication method used in a wireless communication system that includes the communication control apparatus 100 and the CU/DU 200 having configurations described above will be described with reference to a sequence diagram illustrated in FIG. 4. In the description below, a description will be based on the assumption that the two shared RUs 20 are shared by the two CU/DUs 200 that are associated with each of a MNO #0 and a MNO #1. Namely, the CU/DU 200 associated with the MNO #0 communicates, via the shared RU 20, with the UE 30 that is under the purview of the MNO #0, whereas the CU/DU 200 associated with the MNO #1 communicates, via the shared RU 20, with the UE 30 that is under the purview of the MNO #1.

The two shared RUs 20 periodically transmits a predetermined reference signal by using radio transmission (Steps S101 and S102). The UEs 30 administered by the respective MNOs receive reference signals from each of the shared RUs 20 and measure reception quality, such as RSRP. Then, each of the UEs 30 reports information on the measured reception quality to the respective CU/DUs 200 associated with the respective MNOs via the respective shared RUs 20 (Steps S103 and S104), and then, the CU/DUs 200 output notification information including information on the associated reception quality to the communication control apparatus 100.

If the information on the reception quality in each of the UEs 30 is acquired by the communication control apparatus 100, a use band of each of the shared RUs 20 is optimized (Step S105). Namely, the number of unit bands allocated to each of the MNO in each of the shared RUs 20 is set so as not exceed the predetermined upper band use limit, and a band allocation with respect to each of the MNOs is optimized so as to maximize a predetermined metric based on the reception quality of the UE 30. Then, the allocation information indicating the optimized band allocation is output to the CU/DUs 200 (Step S106), and the use band for each of the shared RUs 20 is changed by the CU/DU 200.

The CU/DU 200 transmits data to each of the shared RUs 20 by using the changed band (Steps S107 and S108). At this time, the band is allocated to each of the CU/DUs 200 on the basis of the band optimization performed by the communication control apparatus 100 such that capacity of the FH line between the CU/DU 200 and the shared RU 20 does not exceed; therefore, output capacity of the CU/DU 200 and capacity of the FH line do not exceed. Furthermore, data is transmitted and received to and from the shared RU 20 and the UE 30 by using the radio band associated with the subject band (Step S109). Each of the UEs 30 performs communication by using the band allocated such that the metric becomes the maximum; therefore, system capacity is expanded and it is thus possible to improve throughput.

Figure 5:
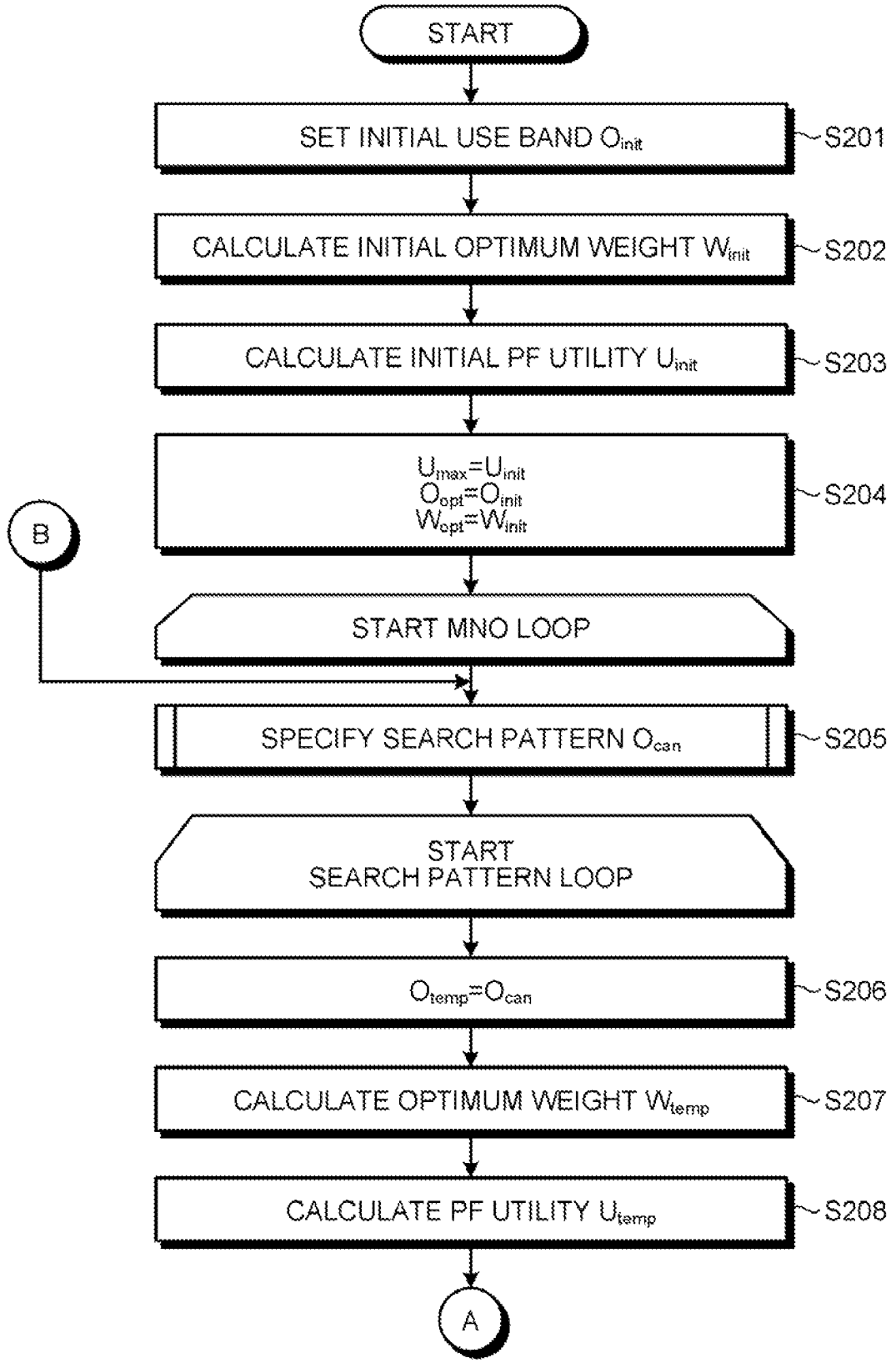
FIG. 5 is a flowchart illustrating a band optimization method according to the first embodiment.
Figure 6:
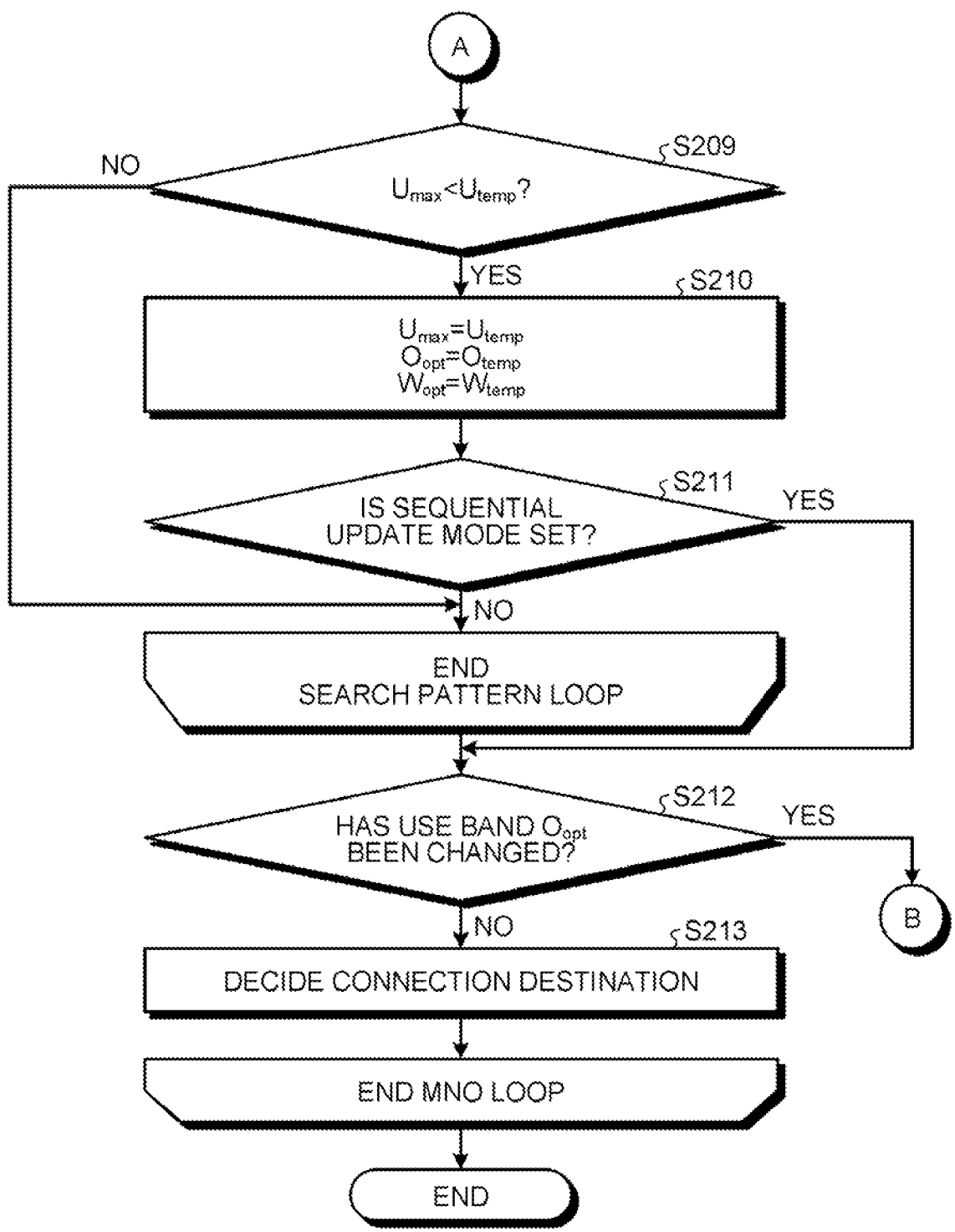
FIG. 6 is a flowchart subsequent to FIG. 5.

In the following, a band optimization method according to the first embodiment will be described with reference to the flowcharts illustrated in FIGS. 5 and 6. Band optimization described below is performed by the band optimization unit 123 included in the communication control apparatus 100.

First, an initial value (hereinafter, referred to as an "initial use band") of a use band for each of the shared RUs 20 is set in accordance with the upper band use limit notified from the FH band setting unit 122 (Step S201). Namely, a unit band that is used in the shared RU 20 by each of the MNOs is decided such that the use band of each of the shared RUs 20 does not exceed the upper band use limit. Specifically, for example, as illustrated in FIG. 7, it is assumed of a case where the CU/DUs 200 managed by MNOs #0 and #1 use RUs #0 to #3.

Figure 7A:
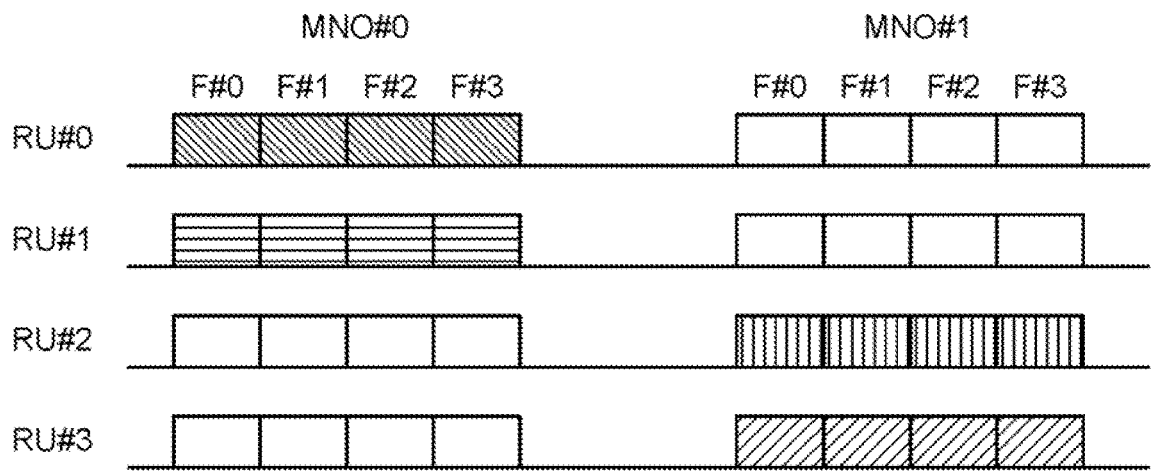
FIGS. 7A, 7B and 7C are diagrams illustrating initial use bands.

The diagram illustrated in FIG. 7A indicates the use bands in a case where the RUs #0 and #1 are dedicated RUs for the MNO #0 and the RUs #2 and #3 are dedicated RUs for the MNO #1. As indicated by FIG. 7A, unit bands F #0 to #3 of the RU #0 are allocated to a first CU/DU associated with the MNO #0, whereas the unit bands F #0 to #3 of the RU #1 are allocated to a second CU/DU associated with the MNO #0. Similarly, the unit bands F #0 to #3 of the RU #2 are allocated to the first CU/DU associated with the MNO #1, whereas the unit bands F #0 to #3 of the RU #3 are allocated to the second CU/DU associated with the MNO #1. In this case, it is assumed that the RUs #0 to #3 are changed to the shared RU 20. Furthermore, it is assumed that, regarding the RUs #0 to #3 each of which is the shared RU 20, the upper band use limit is set by the FH band setting unit 122 to the unit bands having the same number as that of the use bands indicated by FIG. 7A. Namely, it is assumed that the upper band use limit of each of the RUs #0 to #3 is set to four unit bands.

Figure 7B:
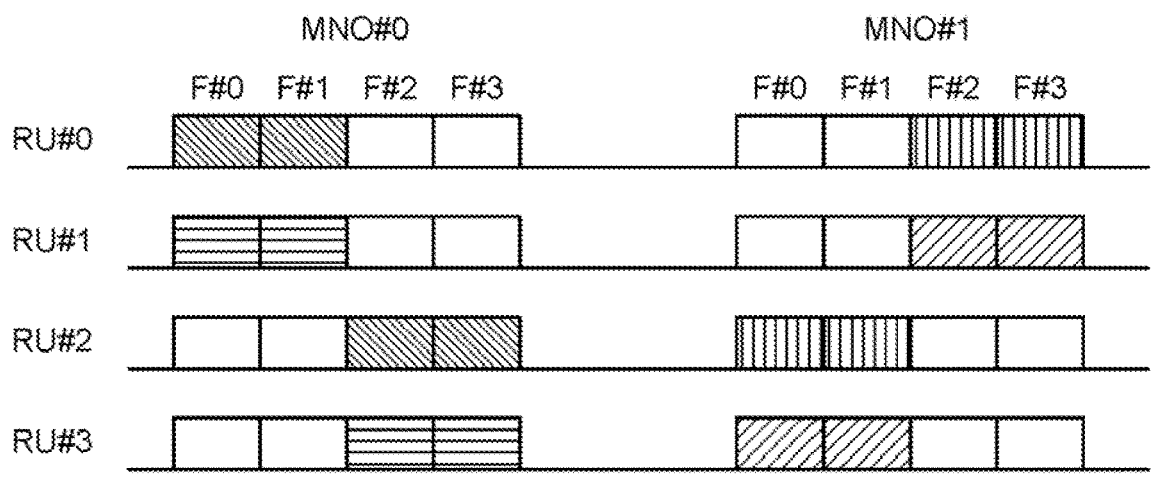

In this case, regarding the initial use band, for example, as indicated by FIG. 7B, the unit bands F #0 and #1 of the RU #0 can be allocated to the first CU/DU 200 associated with the MNO #0, and the unit bands F #2 and #3 of the RU #0 can be allocated to the first CU/DU 200 associated with the MNO #1. Furthermore, the unit bands F #0 and #1 of the RU #1 can be allocated to the second CU/DU 200 associated with the MNO #0, and the unit bands F #2 and #3 of the RU #1 can be allocated to the second CU/DU 200 associated with the MNO #1. Furthermore, the unit bands F #2 and #3 of the RU #2 can be allocated to the first CU/DU 200 associated with the MNO #0, and the unit bands F #0 and #1 of the RU #2 can be allocated to the first CU/DU 200 associated with the MNO #1. Furthermore, the unit bands F #2 and #3 of the RU #3 can be allocated to the second CU/DU 200 associated with the MNO #0, and the unit bands F #0 and #1 of the RU #3 can be allocated to the second CU/DU 200 associated with the MNO #1.

Figure 7C:
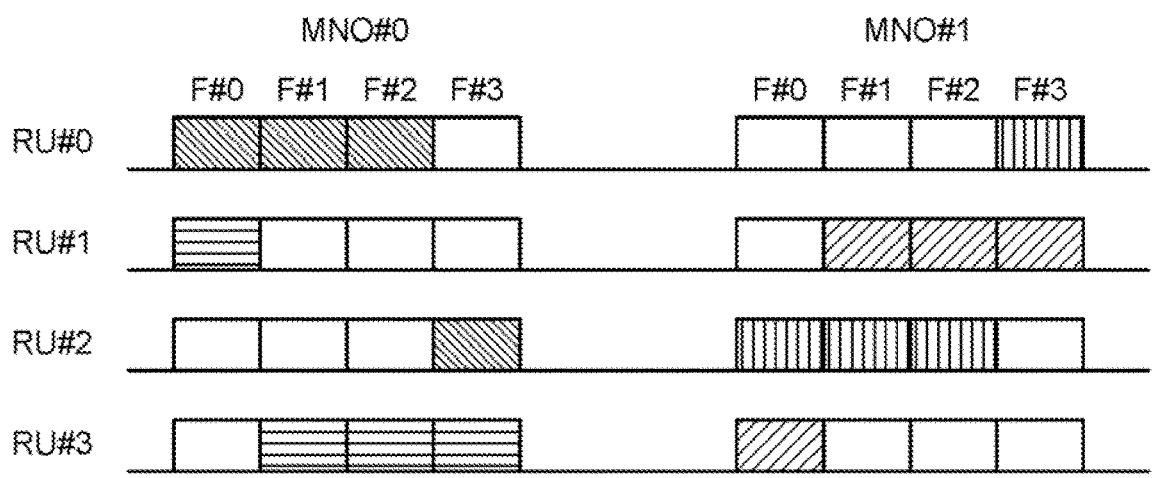

In this way, the initial use band is decided so as not to exceed the upper band use limit of each of the shared RUs 20 and is decided such that an output amount from each of the CU/DUs 200 associated with the respective MNOs does not exceed a predetermined threshold. Furthermore, in the diagram indicated by FIG. 7B, the number of unit bands allocated to the MNOs #0 and #1 in the respective shared RUs 20 is the same; however, for example, as indicated by FIG. 7C, the number of unit bands allocated to the MNOs #0 and #1 in the respective shared RUs 20 may also be different. Even in a case of the initial use band indicated by FIG. 7C, the initial use band does not exceed the upper band use limit of each of the shared RUs 20 and the output amount of each of the CU/DUs 200 associated with the respective MNOs does not exceed the predetermined threshold.

The initial use band for each of the shared RUs 20 and for each of the CU/DUs 200 associated with the respective MNOs can be represented by a matrix $O_{init}$. Specifically, for example, as illustrated in FIG. 8, it is possible to represent the initial use band by a use band matrix O formed from the rows associated with the shared RUs 20 and the columns associated with the available unit bands for the respective MNOs. In the use band matrix O illustrated in FIG. 8, the element associated with the band that is used by each of the MNOs in the respective shared RUs 20 represents "1", whereas the element associated with the band that is not used by each of the MNOs represents "0". As described above, if the initial use band that does not exceed the upper band use limit is appropriately decided, the matrix $O_{init}$ associated with the decided initial use band is set.

Then, a weight for each unit band that is optimum for each of the UEs 30 in a case where the initial use band is used is calculated. Namely, an optimum weight matrix $W_{init}$ that maximizes the metric corresponding to an indicator of band allocation fairness with respect to each of the MNOs and an indicator of throughput in a case where the initial use band is used is calculated (Step S202). Here, a metric U corresponding to an indicator of band allocation fairness with respect to each of the MNOs and an indicator of throughput can be defined by, for example, Equation (1) below.

$$U = \sum^{N_{MNO}} \sum^{N_{UE}} \log\left(\sum^{N_F} \sum^{N_{RU}} w_{m,t,f,u} \cdot r_{m,t,f,u}\right) \quad (1)$$

The metric U acts as an indicator of both of band allocation fairness and system throughput and can be referred to as a proportional fairness (PF) utility. In Equation (1), $N_{MNO}$ denotes the total number of MNOs, $N_{UE}$ denotes the total number of the UEs 30, NF denotes the total number of unit bands in each of the shared RUs 20, and $N_{RU}$ denotes the total number of the shared RUs 20. Furthermore, $w_{m,t,f,u}$ denote elements associated with an MNO #m, an RU #t, an unit band F #f, and an UE #u that are associated with the optimum weight matrix W and indicate weights related to the UE #u using the subject unit band F #f. Furthermore, $r_{m,t,f,u}$ denote a predicted communication rate in the MNO #m, the RU #t, the unit band F #f, and the UE #u and can be calculated by using Equation (2) below.

$$r_{m,t,f,u} = B_{m,t,f} \log_2(1 + \gamma_{m,t,f,u}) \quad (2)$$

where, in Equation (2), $B_{m,t,f}$ denotes a bandwidth of the MNO #m, the RU #t, and the unit band F #f and is a value that is previously set. Furthermore, $\gamma_{m,t,f,u}$ denotes a predicted reception a Signal to Interference Noise Ratio (SINR) associated with the MNO #m, the RU #t, the unit band F #f, and the UE #u and indicates a reception SINR in the UE #u using the subject unit band F #f. Furthermore, $\gamma_{m,t,f,u}$ can be calculated from Equation (3) below by using the reception quality collected by the reception quality collecting unit 121.

$$\gamma_{m,t,f,u} = \frac{P_{tx} \cdot O_{m,t,f} \cdot g_{m,t,u}}{\sigma^2 + \sum_{k' \neq t}^{N_{RU}} P_{tx} \cdot O_{m,t',f} \cdot g_{m,t',u}} \quad (3)$$

where, in Equation (3), $p_{tx}$ denotes transmission power of each of the shared RUs 20, and $O_{n,t,f}$ denotes the elements associated with the MNO #m, the RU #t, and the unit band F #f of the use band matrix O and indicates whether the subject unit band F #f is used. Furthermore, $g_{m,t,u}$ denotes a channel gain in each of the MNO #m, the RU #t, and the UE #u and indicates reception quality, such as the RSRP. Furthermore, $\sigma^2$ denotes noise, such as thermal noise.

The optimum weight matrix $W_{init}$ that maximizes the metric U in Equation (1) above can be obtained by calculating $w_{m,t,f,u}$ represented by Equation (1) above by using the Karush-Kuhn-Tucker (KKT) conditions under the condition in which the sum of the weights of all of the UEs 30 in the unit band F #f used is 1. $w_{m,t,f,u}$ can be calculated by using Equation (4) below.

$$w_{m,t,f,u} = \max\left(0, \frac{1}{\mu_{m,t,f}} - \frac{T'_{m,t,f,u}}{r_{m,t,f,u}}\right) \quad (4)$$

where, in Equation (4), $\mu_{m,t,f}$ denotes Lagrange's method of undetermined multipliers corresponding to the condition in which the sum of the weight of all of the UEs 30 in the unit band F #f used is 1. Furthermore, $T'_{m,t,f,u}$ denotes the total throughput of the UE #u excluding the throughput in the MNO #m, the RU #t, and the unit band F #f. Furthermore, $r_{m,t,f,u}$ denotes the predicted communication rates in the MNO #m, the RU #t, the unit band F #f, and the UE #u, as described above.

The optimum weight matrix $W_{init}$ calculated in this way is obtained for each MNO and indicates the optimum weight for each unit band for each of the UEs 30 in a case where the initial use band is used. Specifically, for example, as illustrated in FIG. 9, the optimum weight matrix W is formed from the rows associated with the UEs 30 and the columns associated with the available unit bands for the respective shared RUs 20. Regarding the unit band associated with each of the columns in the optimum weight matrix W, it is decided by the use band matrix O whether the unit band for each MNO is to be used, and regarding the unused unit band (i.e., the unit band in which the element represented by 0 in the use band matrix O), the weight of all of the UEs 30 becomes 0.

Then, each of the UEs 30 performs wireless communication with the shared RU 20 by using the unit band having the maximum weight in the optimum weight matrix W, so that the system throughput can be maximized. In FIG. 9, regarding the UEs #0, #3, #4, and #25, the maximum weights are indicated by oblique lines. Namely, the UE #0 performs wireless communication with a RU #10 by using the unit band F #0, the UE #3 performs wireless communication with the RU #10 by using the unit band F #0, the UE #4 performs wireless communication with the RU #0 by using the unit band F #0, and the UE #25 performs wireless communication with the RU #0 by using the unit band F #0, so that the system throughput can be maximized.

If the optimum weight matrix $W_{init}$ associated with the initial use band is calculated, a PF utility $U_{init}$ according to the optimum weight matrix $W_{init}$ is calculated (Step S203). Namely, the metric U represented by Equation (1) is calculated from the optimum weight matrix $W_{init}$. Then, the initial values of variables $U_{max}$, $O_{opt}$, and $W_{opt}$ that optimize the use bands are set to the PF utility $U_{init}$, the use band matrix $O_{init}$, and the optimum weight matrix $W_{init}$, respectively (Step S204). The subsequent processes are repeated for each of the MNO, and the optimum use bands in the shared RUs 20 for the MNOs are decided.

First, a search pattern $O_{can}$ that can be formed by interchanging the use bands used by the same MNO between the shared RUs 20 is specified from the pattern of the use band associated with the current use band matrix $O_{opt}$ (Step S205). Namely, it is possible to specify the search pattern $O_{can}$ by obtaining an operation such that, regarding a certain single unit band, the use of the unit band used by one of a pair of the shared RUs 20 is stopped and the use of the unit band used by the other one of the shared RU 20 is started, whereas, regarding another single unit band, the use of the other unit band used by one of the same pair of the shared RUs 20 is started and the use of the subject unit band used by the other one of the shared RUs 20 is stopped. In the search pattern $O_{can}$, the total amount of use bands of the shared RUs 20 is not changed from the pattern of the use bands associated with the use band matrix $O_{opt}$; therefore, the use bands do not exceed each of the upper band use limits of the respective shared RUs 20. Furthermore, a specifying process of the search pattern $O_{can}$ will be described later in detail.

If the search pattern $O_{can}$ is specified, the following processes are repeated for each of the search patterns $O_{can}$.

Namely, the search pattern $O_{can}$ is set as a temporary use band matrix $O_{temp}$ (Step S206), and the optimum weight matrix $W_{temp}$ under the condition of the use band matrix $O_{temp}$ is calculated using Equation (4) above (Step S207). Then, if the optimum weight matrix $W_{temp}$ is calculated, the PF utility $U_{temp}$ according to the optimum weight matrix $W_{temp}$ is calculated using Equation (1) above (Step S208). The PF utility $U_{temp}$ calculated in this way is the maximum PF utility that is used under the condition of the search pattern $O_{can}$.

Thus, it is determined whether the PF utility $U_{temp}$ used under the condition of the search pattern $O_{can}$ is greater than a current PF utility $U_{max}$ (Step S209). Namely, by changing the use bands to the use bands associated with the search pattern $O_{can}$, it is determined whether a metric can be increased. If the determination result indicates that the PF utility $U_{temp}$ is less than or equal to the current PF utility $U_{max}$ (No at Step S209), the determination related to the search pattern $O_{can}$ is completed, and the process at Step S206 and the subsequent processes are repeated for the other search patterns $O_{can}$.

In contrast, if the PF utility $U_{temp}$ is greater than the current PF utility $U_{max}$ (Yes at Step S209), the variables $U_{max}$, $O_{opt}$, and $W_{opt}$ are updated to the PF utility $U_{temp}$, the use band matrix $O_{temp}$, and the optimum weight matrix $W_{temp}$, respectively, that are associated with the search pattern $O_{can}$ (Step S210). Then, if at least one of the search patterns $O_{can}$ that further increases the PF utility $U_{max}$ is detected, it is determined whether a sequential update mode for omitting the determination of the other search patterns $O_{can}$ is set (Step S211).

If the sequential update mode is not set (No at Step S211), in order to check presence or absence of the search pattern $O_{can}$ that further increases the PF utility $U_{max}$, the process at Step S206 and the subsequent processes are repeated for the other search patterns $O_{can}$. Then, if the processes at Step S206 to S211 have been completed for all of the search patterns $O_{can}$, it is determined, at the repeatedly performed processes at Steps S206 to S211, whether the use band matrix $O_{opt}$ has been changed (Step S212).

In contrast, if the sequential update mode is set (Yes at Step S211), the PF utility $U_{max}$, the use band matrix $O_{opt}$, and the optimum weight matrix $W_{opt}$ have been updated, so that determination of the other search patterns $O_{can}$ is omitted. Then, it is determined, at the repeatedly performed processes at Steps S206 to S211, whether the use band matrix $O_{opt}$ has been changed (Step S212).

In the determination performed at Step S212, if it is determined that the use band matrix $O_{opt}$ has been changed (Yes at Step S212), the use band matrix $O_{opt}$ that further increases the PF utility $U_{max}$ on the basis of the new use band matrix $O_{opt}$ is possibly present. Thus, the process at Step S205 is again performed, and the processes at Steps S206 to S211 described above are repeated for the search pattern $O_{can}$ performed on the basis of the new use band matrix $O_{opt}$.

In contrast, in the determination performed at Step S212, if it is determined that the use band matrix $O_{opt}$ is not changed (No at Step S212), it is determined that the PF utility $U_{max}$ according to the use band matrix $O_{opt}$ at this time is the maximum, the use band of each of the shared RUs 20 is fixed in accordance with the use band matrix $O_{opt}$. Namely, the unit band in which the element is "1" in the use band matrix $O_{opt}$ is fixed as the use band of each of the shared RUs 20. Furthermore, the UEs 30 to be connected to the shared RUs 20 using the associated use bands are decided in accordance with the optimum weight matrix $W_{opt}$ that is used at this point of time (Step S213). Namely, the unit band having the maximum weight in the optimum weight matrix $W_{opt}$ is decided as the destination of each of the UEs 30.

By repeatedly performing the process at Steps S205 to S213 described above for each MNO, the use band for each MNO in each of the shared RUs 20 is decided, and the UEs 30 that perform wireless communication with the shared RUs 20 by using the respective use bands are decided. Then, these use bands are the use bands that maximize the PF utility, and it is possible to guarantee band allocation fairness with respect to each of the MNOs and maximize system throughput.

In the following, the above described process for specifying the search pattern $O_{can}$ performed at Step S205 will be described with reference to the flowchart illustrated in FIG. 10 by using specific examples.

First, the use band matrix $O_{base}$ that is based on before the interchange of the use bands is set to the current use band matrix $O_{opt}$ (Step S301). Then, a first unit band which is a use band in one of the shared RUs 20 and is not a use band in the other one of the shared RUs 20, and a pair of the shared RUs 20 that satisfies this condition of the first unit band are selected from the use band matrix $O_{base}$ (Step S302).

Figures 11A, 11B:
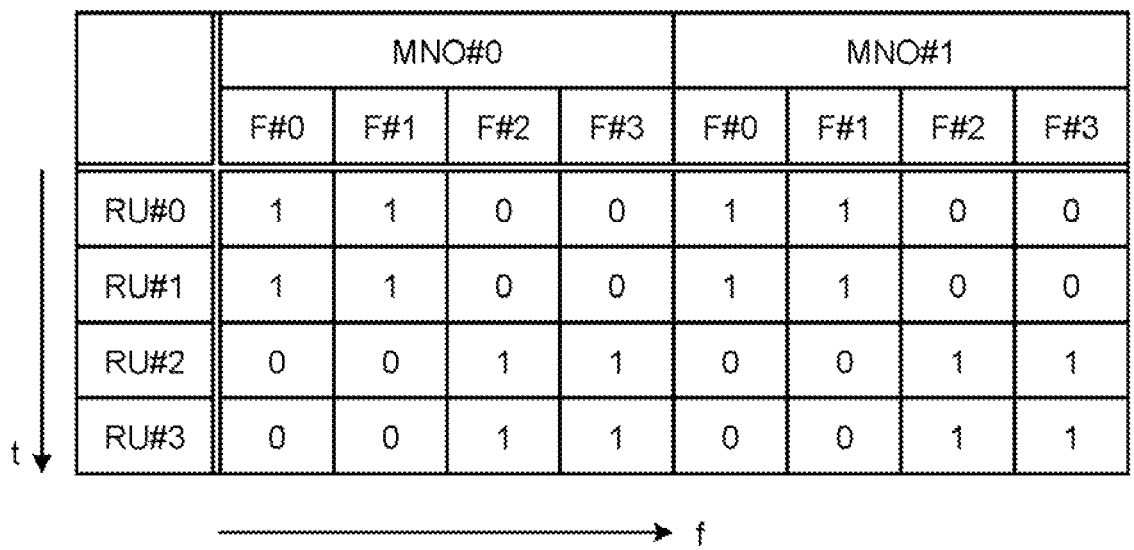
FIGS. 11A and 11B are diagrams illustrating specific examples of a search pattern.

Specifically, the use band matrix $O_{base}$ is formed from, for example, as indicated by FIG. 11A, the rows associated with the shared RUs 20 and the columns associated with the available unit bands for each MNO and is set such that the elements associated with the unit bands that act as the use band represent "1" and the elements associated with the unit bands that do not act as the use band represent "0". In the use band matrix $O_{base}$ that is set in this way, if the element at the t-th row from the top and the f-th column from the left is represented by (t,f), for example, in the area associated with the MNO #0 in the use band matrix $O_{base}$, the pair of the RU #t1 and the RU #t2 and the first unit band F #f1 which satisfy a condition that the element at (t1,f1) represents "1" and the element at (t2,f1) represents "0" are selected. In the example indicated by FIG. 11A, for example, the pair of the RU #0 and the RU #2 with the unit band F #0 satisfies the condition.

If the combination of the pair of the shared RUs 20 and the first unit band is selected, it is determined whether a second unit band having an inverse relation to the first unit band regarding whether to use the band is present in the unit band of the pair of the shared RUs 20 (Step S303). Namely, for example, in the area associated with the MNO #0 in the use band matrix $O_{base}$, it is determined whether the second unit band F #f2 that satisfies a condition that the element at (t1,f2) represents "0" and the element at (t2,f2) represents "1" is present.

If the determination result indicates that the second unit band F #f2 that satisfies the condition is present (Yes at Step S303), regarding the first unit band and the second unit band for the selected pair of the shared RUs 20, the search pattern $O_{can}$ is set by interchanging the state whether to use the band (Step S304). Namely, the element at (t1,f1) in the use band matrix $O_{base}$ is changed from "1" to "0", the element at (t2,f1) is changed from "0" to "1", the element at (t1,f2) is changed from "0" to "1", and the element at (t2,f2) is changed from "1" to "0", so that it is possible to obtain the use band matrix $O_{can}$ indicating the search pattern.

Specifically, for example, as indicated by FIGS. 11A and 11B, the state whether to use the band in the first unit band F #0 for the pair of the RU #0 and the RU #2 is interchanged, and the state whether to use the band in the second unit band F #2 is also interchanged. Consequently, the search pattern $O_{can}$ indicated by FIG. 11B can be obtained from the use band matrix $O_{base}$ indicated by FIG. 11A.

In this way, if the single search pattern $O_{can}$ is specified or if the second unit band F #f2 is not present in the determination process performed at Step S303 (No at Step S303), it is determined whether determination of presence or absence of the second unit band has been completed for all of the combination of the pairs of the shared RUs 20 and the first unit band (Step S305). If the determination has been completed for all of the combinations (Yes at Step S305), the specifying process of the search pattern $O_{can}$ has been completed. In contrast, if a combination that has not been determined regarding presence or absence of the second unit band is present (No at Step S305), another combination of a pair of the shared RUs 20 and the first unit band is selected again at Step S302.

In this way, in the current use band matrix $O_{opt}$, by specifying the search pattern $O_{can}$ one by one by interchanging the use bands used by the same MNO between the shared RUs 20, it is possible to specify all of the use band patterns in each of which the state whether to use the band for a single combination of unit bands is interchanged from the current use band matrix $O_{opt}$. Furthermore, similarly to the current use band matrix $O_{opt}$, in all of the specified search patterns $O_{can}$, the use bands do not exceed the upper band use limit. As described above, the use band matrix $O_{opt}$ that further increases the current PF utility $U_{max}$ is searched for in the search pattern $O_{can}$, and the use bands in the shared RUs 20 are optimized.

As described above, according to the embodiment, the use band allocated to each MNOs in the shared RU is set so as not to exceed the predetermined upper band use limit, and allocation of the use band with respect to each MNO such that the predetermined metric based on the reception quality of the UE becomes the maximum. Consequently, even if each MNO uses the allocated use band, capacity of the FH line does not exceed and it is thus possible to maximize system throughput. In other words, it is possible to accelerate expansion of the system capacity.

[b] Second Embodiment

In the first embodiment described above, a search pattern for searching for an optimum use band matrix by interchanging the use bands used by the same MNO; however, it is possible to interchange the use bands across the MNOs. Accordingly, in a second embodiment, a process performed in a case of specifying a search pattern by interchanging the use bands across the MNOs will be described.

Configurations of a wireless communication system, a communication control apparatus, and a CU/DU according to the second embodiment are the same as those described in the first embodiment (FIGS. 1 to 3); therefore, descriptions thereof will be omitted. In the second embodiment, a band optimization method used in the band optimization unit 123 included in the communication control apparatus 100 is different from that used in the first embodiment.

Figure 12:
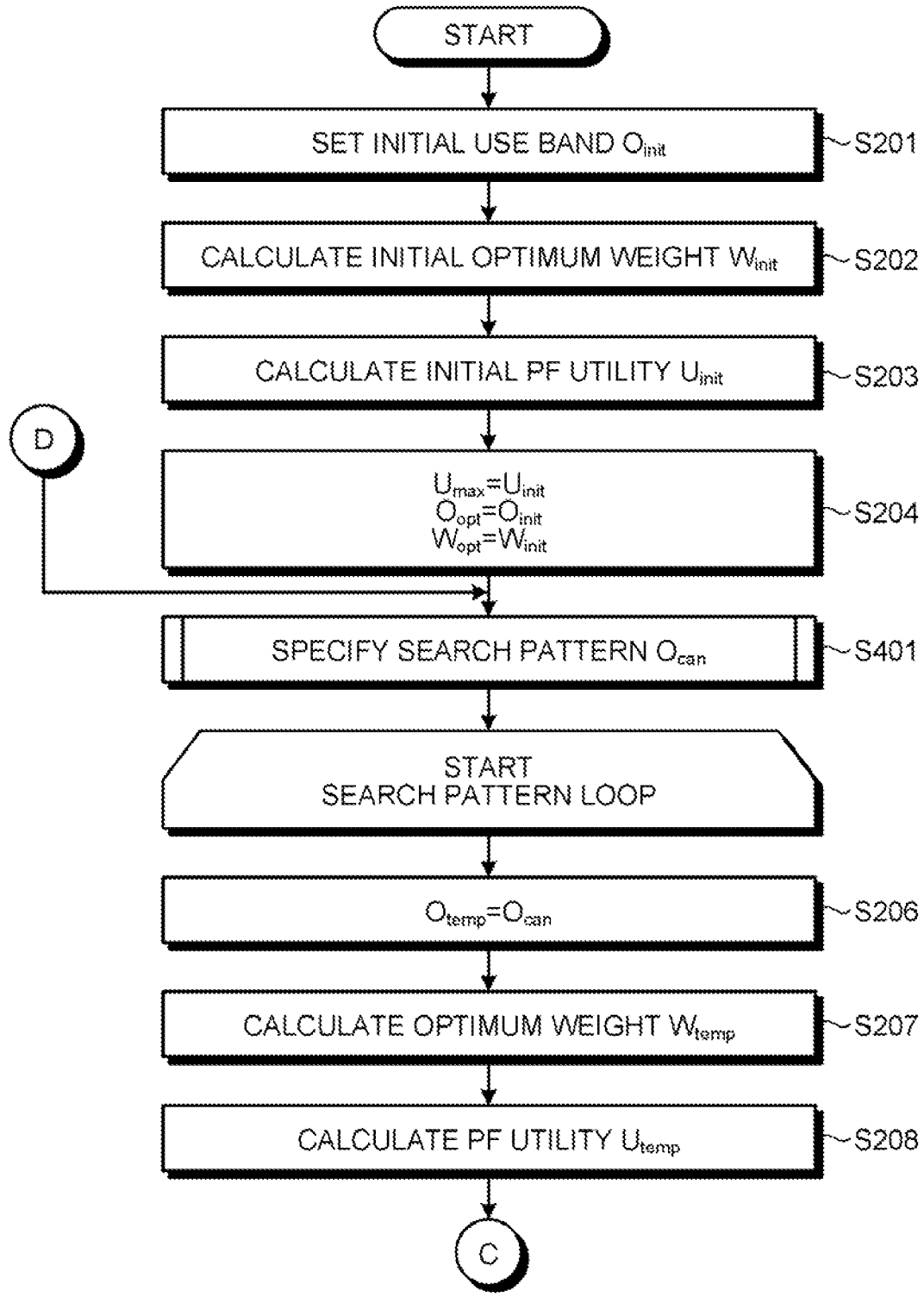
FIG. 12 is a flowchart illustrating a band optimization method according to a second embodiment.
Figure 13:
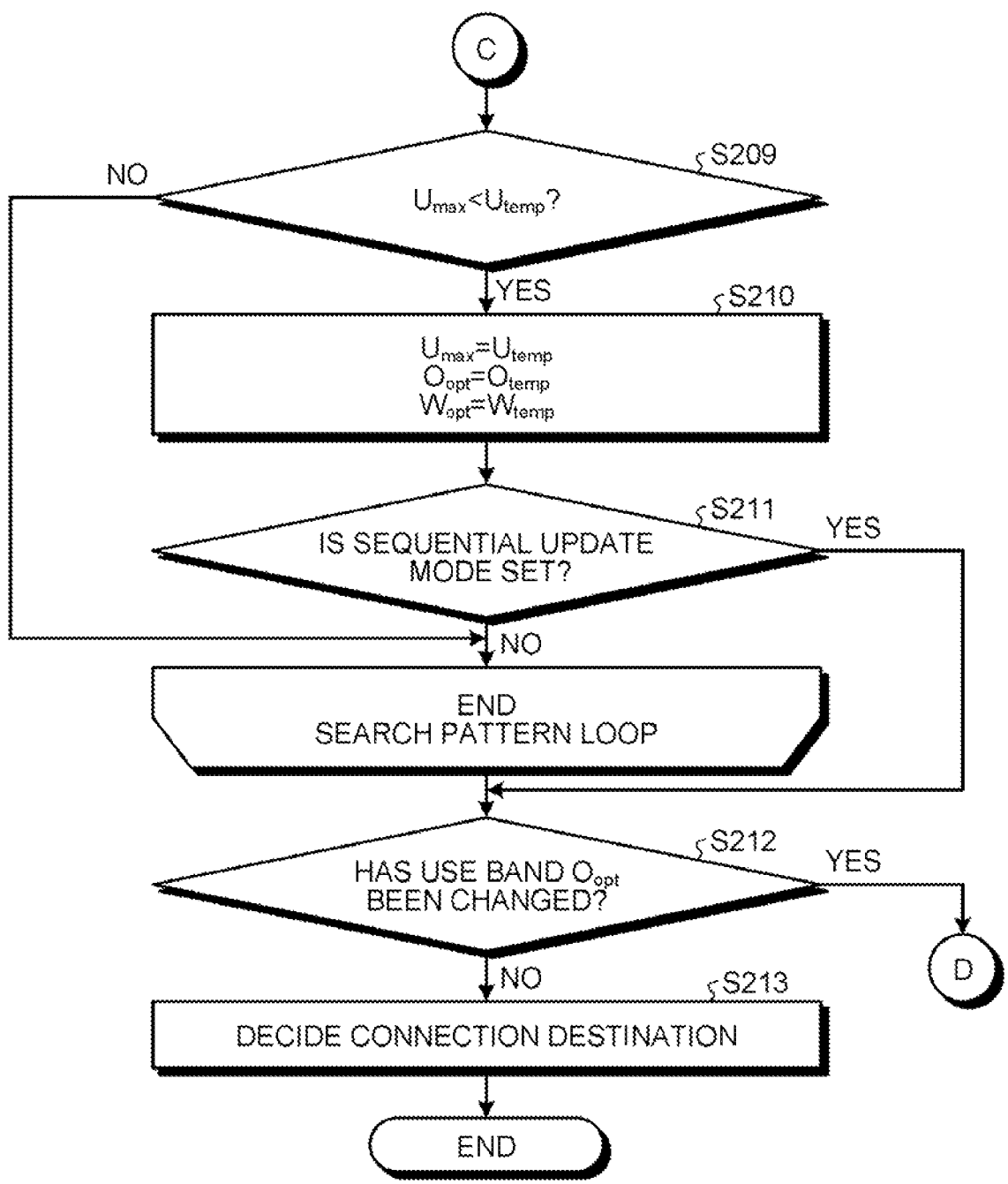
FIG. 13 is a flowchart subsequent to FIG. 12.

FIGS. 12 and 13 are flowchart each illustrating the band optimization method according to the second embodiment. In FIGS. 12 and 13, steps that are the same as those illustrated in FIGS. 5 and 6 are assigned the same reference numerals and descriptions thereof in detail will be omitted.

First, the initial use band for each of the shared RUs 20 is set in accordance with the upper band use limit that is notified from the FH band setting unit 122 (Step S201), and the optimum weight matrix $W_{init}$ and the PF utility $U_{init}$ associated with the initial use band are calculated (Steps S202 and S203). Then, the initial values of the variables $U_{max}$, Copt, and $W_{opt}$ for optimizing the use bands are set to the PF utility $U_{init}$, the use band matrix $O_{init}$, and the optimum weight matrix $W_{init}$, respectively (Step S204).

If the initial values of the respective variables are set, the search pattern $O_{can}$ that can be formed by interchanging the use bands between the shared RUs 20 from the pattern of the use bands associated with the current use band matrix $O_{opt}$ is specified (Step S401). Here, unlike the first embodiment, the use bands are allowed to be interchanged across the MNOs. Namely, the search pattern $O_{can}$ may be specified by performing an operation such that a certain MNO stops the use of an available unit band for one of a pair of the shared RUs 20 and starts the use of the available unit band for the other one of the pair of the shared RUs 20, whereas the other MNO starts the use of an available unit band for one of the same pair of the shared RUs 20 and stops the use of the available unit band for the other one of the pair of the shared RUs 20. With the specified search pattern $O_{can}$, the total amount of the use bands of each of the shared RUs 20 is not changed from the pattern of the use bands associated with the current use band matrix $O_{opt}$; therefore, the use bands do not exceed the upper band use limit of each of the shared RUs 20. Furthermore, a specifying process of the search pattern $O_{can}$ will be described later in detail.

If the search pattern $O_{can}$ is specified, the following processes are repeated for each of the search patterns $O_{can}$.

Namely, the search pattern $O_{can}$ is set as a temporary use band matrix $O_{temp}$ (Step S206), and the optimum weight matrix $W_{temp}$ and the PF utility $U_{temp}$ under the condition of the use band matrix $O_{temp}$ is calculated (Steps S207 and S208). Then, it is determined whether the PF utility $U_{temp}$ is larger than the current PF utility $U_{max}$ (Step S209), and, if the PF utility $U_{temp}$ is less than or equal to the current PF utility $U_{max}$ (No at Step S209), the process at Step S206 and the subsequent processes are repeated for the other search patterns $O_{Can}$.

In contrast, if the PF utility $U_{temp}$ is larger than the current PF utility $U_{max}$ (Yes at Step S209), the variables $U_{max}$, Copt, and $W_{opt}$ are updated to the PF utility $U_{temp}$, the use band matrix $O_{temp}$, and the optimum weight matrix $W_{temp}$, respectively, that are associated with the search pattern $O_{can}$ (Step S210). Then, it is determined whether the sequential update mode is set (Step S211), and, if the sequential update mode is not set (No at Step S211), the process at Step S206 and the subsequent processes are repeated for the other search patterns $O_{can}$. Then, if the processes at Steps S206 to S211 are completed for all of the search patterns $O_{can}$, it is determined whether the use band matrix $O_{opt}$ has been changed in the repeated processes at Steps S206 to S211 (Step S212).

Furthermore, the sequential update mode is set (Yes at Step S211), because the PF utility $U_{max}$, the use band matrix $O_{opt}$, and the optimum weight matrix $W_{opt}$ have been updated, determination related to the other search patterns $O_{can}$ is omitted. Then, in the repeated processes at Steps S206 to S211, it is determined whether the use band matrix $O_{opt}$ has been changed (Step S212).

In the determination process at Step S212, if it is determined that the use band matrix $O_{opt}$ has been changed (Yes at Step S212), the process at Step S401 is again performed, the processes at Steps S206 to S211 described above are repeated for the search pattern $O_{can}$ on the basis of the new use band matrix $O_{opt}$. In contrast, in the determination process at Step S212, if it is determined that the use band matrix $O_{opt}$ has not been changed (No at Step S212), the use band of each of the shared RUs 20 is fixed in accordance with the use band matrix $O_{opt}$ at this point of time. Furthermore, the UEs 30 to be connected to the shared RUs 20 by using the respective use bands are decided in accordance with the optimum weight matrix $W_{opt}$ at this point of time (Step S213).

In the embodiment, the search pattern $O_{can}$ is specified by allowing the interchange of the use bands across the MNOs; therefore, the use band for each MNO in each of the shared RUs 20 is decided without repeating the above described processes for each MNO, and the UEs 30 that perform wireless communication with the shared RUs 20 using the respective use bands are decided. Then, these use bands maximize the PF utility, and it is possible to guarantee band allocation fairness with respect to each MNO and maximize system throughput.

In the following, the above described specifying process of the search pattern $O_{can}$ performed at Step S401 will be described with reference to the flowchart illustrated in FIG. 14 by using a specific example. In FIG. 14, steps that are the same as those illustrated in FIG. 10 are assigned the same reference numerals and descriptions thereof will be omitted.

First, the use band matrix $O_{base}$ that is based on before the interchange of the use bands is set to the current use band matrix $O_{opt}$ (Step S301). Then, the first unit band which is a use band for the first MNO in one of the shared RUs 20 and is not a use band for the first MNO in another one of the shared RUs 20, and a pair of the shared RUs 20 that satisfies this condition of the first unit band are selected from the use band matrix $O_{base}$ (Step S501).

Specifically, the use band matrix $O_{base}$ is formed from, for example, as indicated by FIG. 15A, the rows associated with the shared RUs 20 and the columns associated with the available unit bands for the respective MNO and is set such that the elements associated with the unit bands that act as the use bands represent "1" and elements associated with the unit bands that do not act as the use bands represent "0". In the use band matrix $O_{base}$ that is set in this way, if the element at the t-th row from the top related to the m-th MNO and the f-th column from the left is represented by (m,t,f), for example, in the use band matrix $O_{base}$, the pair of the RU #t1 and the RU #t2 and the first unit band F #1 for the first MNO #m1 which satisfy a condition that the element at (m1,t1,f1) represents "1" and the element at (m1,t2,f1) represents "0" are selected. In the example indicated by FIG. 15A, for example, the pair of the RU #1 and the RU #2 with the unit band F #1 for the MNO #0 satisfies the condition.

If the combination of the pair of the shared RUs 20, the first MNO, and the first unit band is selected, it is determined whether the second unit band used by the second MNO having inverted use state relative to the first unit band used by the first MNO is present in the unit band used by the pair of the subject shared RUs 20 (Step S502). Namely, for example, it is determined whether a second MNO #m2 and the second unit band F #f2 that satisfy a condition that (m2,t1,f2) represents "0" and (m2,t2,f2) represents "1" are present, in the use band matrix $O_{base}$. Furthermore, the second MNO #m2 need not always be the MNO that is different from the first MNO #m1 and is one of the MNOs that includes the first MNO #m1.

If the determination result indicates that the second MNO #m2 and the second unit band F #f2 that satisfy the condition is present (Yes at Step S502), the search pattern $O_{can}$ is set by interchanging the state whether to use the band regarding the first unit band of the selected pair of the shared RUs 20 and the second unit band (Step S503). Namely, the use band matrix $O_{can}$ indicating the search pattern is obtained by performing an operation such that, in the use band matrix $O_{base}$, the element at (m1,t1,f1) is changed from "1" to "0", the element at (m1,t2,f1) is changed from "0" to "1", the element at (m2,t1,f2) is changed from "0" to "1", and the element at (m2,t2,f2) is changed from "1" to "0".

Specifically, for example, as indicated by FIGS. 15A and 15B, the state whether to use the first unit band F #1 for the first MNO #0 associated with the pair of the RU #1 and the RU #2 is interchanged and the state whether to use the second unit band F #2 for the second MNO #1 is interchanged. Consequently, the search pattern $O_{can}$ indicated by FIG. 15B is obtained from the use band matrix $O_{base}$ indicated by FIG. 15A.

If the single search pattern $O_{can}$ is specified in this way or if the second MNO #m2 and the second unit band F #f2 are not present in the determination performed at Step S502 (No at Step S502), it is determined whether determination of presence or absence of the second MNO and the second unit band has been completed for all of the combinations of the pair of the shared RUs 20, the first MNO, and the first unit band (Step S305). If the determination has been completed for all of the combinations (Yes at Step S305), the specifying process of the search pattern $O_{can}$ has been completed. In contrast, if a combination that has not been determined regarding presence or absence of the second MNO and the second unit band is present (No at Step S305), another combination of the pair of the shared RU 20, the first MNO, and the first unit band is selected again at Step S501.

In this way, in the current use band matrix $O_{opt}$, by specifying the search pattern $O_{can}$ one by one by interchanging the use bands used by each of the MNOs between the shared RUs 20, it is possible to specify all of the use band patterns in each of which the state whether to use the band for a single combination of unit bands is interchanged from the current use band matrix $O_{opt}$. Furthermore, in all of the specified search patterns $O_{can}$, similarly to the current use band matrix $O_{opt}$, the use band does not exceed the upper band use limit. As described above, the use band matrix $O_{opt}$ that further increases the current PF utility $U_{max}$ is searched for in the search pattern $O_{can}$ having the characteristics described above and the use bands in the shared RUs 20 is optimized.

As described above, according to the embodiment, the use band allocated to each of the MNOs in the shared RUs is set so as not to exceed the predetermined upper band use limit, allocation of the use band to each of the MNOs is optimized such that predetermined metric based on reception quality of the UEs becomes the maximum. Consequently, even if each of the MNOs uses the allocated use band, capacity of the FH line does not exceed and it is possible to maximize system throughput. In other words, it is possible to accelerate expansion of the system capacity.

According to an aspect of an embodiment of the communication control apparatus and the communication control method disclosed in the present application, an advantage is provided in that it is possible to accelerate expansion of system capacity and improve throughput.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A communication control apparatus that allocates, to a plurality of operators, a band of each of a plurality of radio units that are shared by the operators and that are connected to a plurality of baseband units managed by the operators, the communication control apparatus comprising:
   a memory;
   a processor coupled to the memory and executes a process comprising:
   allocating the band of each of the radio units to the operators in accordance with an upper band use limit that is set for each of the radio units such that a use band used by the operators does not exceed the upper band use limit;
   optimizing the allocating the band of each of the radio units so as to maximize a metric corresponding to an indicator of throughput associated with band allocation with respect to the operators, the metric acting as an indicator of both of band allocation fairness and system throughput for the operators; and
   outputting allocation information indicating the band allocated to the operators by the processor to each of the baseband units.

2. The communication control apparatus according to claim 1, wherein the processor calculates, by using reception quality information on terminal devices that perform wireless communication with the radio units, the metric used when allocation of the band of each of the radio units is changed and obtains the allocation of the band, for each of the radio units that maximizes the calculated metric.

3. The communication control apparatus according to claim 2, wherein the processor obtains the allocation of the band, for each of the radio units, that is associated with the maximum metric when band allocation is changed within the operators.

4. The communication control apparatus according to claim 2, wherein the processor obtains the allocation of the band, for each of the radio units, that is associated with the maximum metric when band allocation is changed across the operators.

5. The communication control apparatus according to claim 1, wherein the processor decides terminal devices that perform wireless communication with the radio units by using the band allocated to the operators.

6. A communication control method for allocating, to a plurality of operators, a band of each of a plurality of radio units that are shared by the operators and that are connected to a plurality of baseband units managed by the operators, the communication control method comprising:
   allocating the band of each of the radio units to the operators in accordance with an upper band use limit that is set for each of the radio units such that a use band used by the operators does not exceed the upper band use limit;
   optimizing the allocating the band of each of the radio units so as to maximize a metric corresponding to an indicator of throughput associated with band allocation with respect to the operators, the metric acting as an indicator of both of band allocation fairness and system throughput for the operators; and
   outputting allocation information indicating the band allocated to the operators to each of the baseband units.

* * * * *